Dec. 24, 1957     D. H. DOLISON     2,817,282
AUTOMOBILE PASSENGER COOLING SYSTEM
Filed Jan. 19, 1954
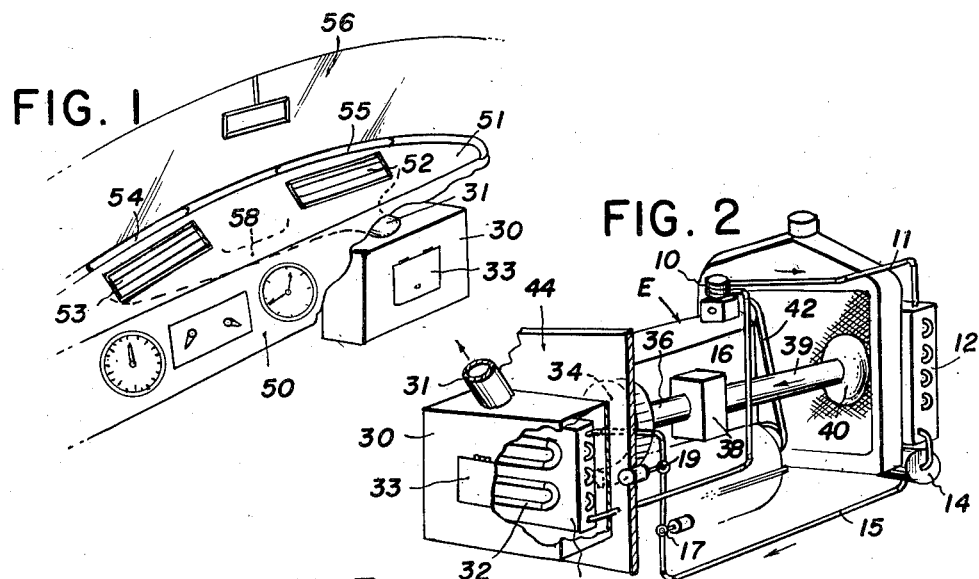
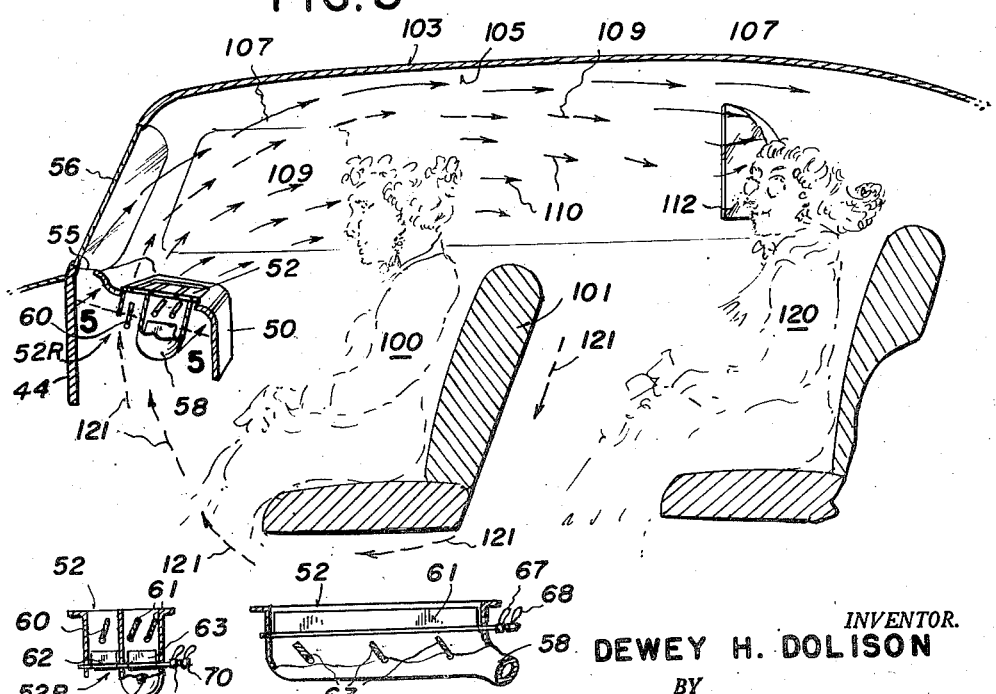
INVENTOR.
DEWEY H. DOLISON
BY
ATTORNEY United States Patent Office 2,817,282
Patented Dec. 24, 1957

2,817,282

AUTOMOBILE PASSENGER COOLING SYSTEM

Dewey H. Dolison, St. Petersburg, Fla.

Application January 19, 1954, Serial No. 404,865

4 Claims. (Cl. 98—2)

This invention relates to air conditioning, and more especially to air conditioning for automobiles.

It is the primary purpose of this invention to provide means for creating cooled zones within the car body which will be of such level and extent as to cool effectively the exposed parts of a passenger's anatomy without forcing the cooled air into direct contact with the outer surface of the automobile.

It is a secondary purpose of this invention to utilize the layers of air directly adjacent the inner surface of the automobile as insulating layers as to so discharge cooled air within the body that a core of air at the desired temperature will be maintained without disturbing the air directly adjacent the outer body surface.

The main purposes of this invention may be said to be the providing of a simplified air cooling unit which will be compact, which will not obstruct or decrease the passenger or storage facilities of the automobile and which will create an inner core or zone directly about the passengers wherein the most comfortable temperature may be maintained with the minimum of heat loss.

Certain other improvements and advantages will appear as the description of the appended drawings progresses.

In the drawings,

Fig. 1 is a presentation of the dash portion of the an automobile taken from the interior thereof and having a portion of the dashboard broken away to show part of the apparatus.

Fig. 2 is a schematic presentation of the refrigeration and heat transfer mechanism.

Fig. 3 is a sectional view taken at approximately the longitudinal center line of the automobile and indicating temperature zones produced by my system.

Fig. 4 is a cross sectional view of the directional discharge ports and is taken approximately at line 5—5 of Fig. 3.

Fig. 5 is a longitudinal cross section of the device of Fig. 4.

The main units of my air conditioning system include a compressor 10 communicating through discharge line 11 with condenser 12 discharging into receiver 14 and therethrough to liquid line 15 having solenoid valve 17 therein and a thermostat expansion valve 19. Liquid line 15 discharges through valves 17 and 19 to expansion coil 20 positioned within heat exchanger 30 which also contains a heat coil 32. It will be understood that heat exchanger 30 consists of a closed chamber into which air is introduced by such means as fan 34 taking air through duct 36 from filter 38 which in turn is supplied by duct 39 from air scoop 40 projecting through and beyond the heat transfer section of the automobile radiator and condenser 12 at the forward end of the car. It will also be understood that compressor 10 is driven through such means as fan belt 42. Heat exchanger 30 is preferably positioned against automobile fire wall 44 through which the fan 34 discharges while the discharge from heat exchanger 30 is normally through duct 31 but may be through door 33 when direct rearward discharge is required. Heat exchanger 30 in its position against fire wall 44 is directly below the automobile dash 50 arranged in which I prefer to provide at least 2 ports 52 and 53 positioned adjacent to but behind the defroster slots 54 and 55 commonly provided for the windshield 56. Communicating with the discharge 31 of the heat exchanger 30, I provide suitable duct work 58 for the transfer of the exchanged air.

Reference to Fig. 4 will show that ports 52 and 53 are provided with directional vanes 60, 61, 62, and 63 and that a portion 52R of such port opens directly into the space beneath dashboard 50 and discharges air upwardly therefrom through the aspirating effect of the forced flow from the duct 58 past the vane 61. Vanes 60 and 61 are independently controlled through links 67 and 68 while vanes 62 and 63 are controlled through similar links 69 and 70, all of which links may be extended to and controlled from the front of dashboard 50 after the method well known to the automobile art.

Special reference to Fig. 3 will show that passenger 100 when in the automobile seat 101 has a considerable distance between her head and the actual top of the automobile indicated at 103. It will be understood that top 103 is subjected to the full heat of the sun and that maximum temperatures through radiation and convection of outside heat will occur on the inner side 105 of this roof although a substantial portion of the exterior heat will also be transferred through windshield 56 through radiated rays as well as by convection.

It is the purpose of this invention to provide a layer of slow moving or substantially motionless air indicated by elongated arrows 107 adjacent to these solid surfaces and below this outer layer to provide a second layer indicated by the broken arrows 109 moving somewhat more rapidly beneath the outer layer and maintained at a temperature between that of the outer layer and of the inner or air conditioned core air whose flow is indicated by the short arrows 110. This effect is obtained first by introducing relatively small amounts of slow speed substantially warmer air through the slots adjacent the windshield 56 which are commonly called defroster slots. In the drawings I have eliminated illustration of the ducts leading to such slots since these are well known and would but complicate the drawings. However, reference to Figs. 3, 4 and 5 will show that vanes 60, 61, 62 and 63 provide means for directing the flow of air conditioned air from duct 58 and of recirculated air through portion 52R of the port so that flow lines may be accurately controlled and directed and that the maximum air conditioned effect may be maintained about the heads and shoulders of the passengers 100 and, where a rear seat in the automobile is involved, rearwardly over the passengers 120 seated therein. Return air will flow beneath the seats as indicated by the arrows with the double dash 121 and pass upwardly through recirculating portion 52R in ports 52 and 53.

Consideration of the structure which has been described will show that in operation, automobile engine E drives compressor 10 through fan belt 42 drawing vapor through suction line 16 and discharging through discharge line 11 to condenser 12 positioned at the front of the automobile radiator and cooled by the motion of the automobile. Condenser 12 reduces the gas to a liquid which flows to receiver 14 and through line 15 via solenoid valve 17 to expansion valve 19 where it is expanded with cooling effect in coils 20 after the fashion well known to the art. Coil 20 in exchanger 30 transfers this cooling effect to air drawn through air scoop 40, duct 39, filter 38, duct 36 and fan 34, it being understood that exterior air taken through scoop 40 may be of sufficient velocity and volume to reduce the use of fan 34 under normal conditions. The tempered air from exchanger 30 is discharged through duct 31 to duct work 58 and therethrough to ports 52 and 53 from whence it flows as indicated by arrows 110 over the automobile passengers or, after second pass to be discharged in part through the ports 112 of the automobile body, but to recirculate in part as indicated by the arrows 121 to the return or recirculation portion of the ports 52 and 53 indicated at 52R. It will be seen that vanes 61 and 63 provide for the accurate direction of this air conditioned air so that the correct height of the zone traversed by air indicated by arrows 110 may be fixed. It will be seen also that manipulation of vane 60 will provide for directing aspirated air through port portions 52R so that it will lie over and hold down the cooled air which has been just described and will interpose itself between such cooled air and the relatively warm air zone indicated by arrows 107, which in turn interposes itself between zone 109 and the heated outer surfaces of the car, indicated by 103 and by 56. In this fashion, the heat insulation of the automobile body is substantially increased, heat losses reduced and the actual air conditioning effect upon the passengers attained with a minimum of power and refrigeration capacity. It will be understood that heat tempering coils 32 are connected to the circulating cooling water of the engine, after the fashion well known to the art, and that such coils may be employed to distribute heat when the outside temperature is below normal, and that in such case, solenoid valve 17 is closed by switch or other suitable device so that the refrigeration system is rendered inoperative. In the case of heating, it is desirable that a portion of the heated air be discharged over the feet of the passengers, and this is the purpose of door 33 in heat exchanger 30.

It will be manifest that by my improved invention, the whole of the cooling apparatus is positioned at the front end of the automobile and that a major portion thereof is placed in the engine space of the automobile, thus eliminating obstructions formerly placed in the automobile trunk at the rear, while at the same time provide that the flow of air inside the automobile shall not oppose the directional flow on the outer surface thereof, thus effecting a susbtantial increase in efficiency of air circulation since the outer pressures correspond with the inner pressures necessary to cooling air circulation.

It will further be obvious that by the herein disclosed invention, an inner core or living space is created for the passengers and that such core is insulated and isolated from the outer portions of the automobile and from the outer temperatures. Manifestly many changes and modifications may be made in the embodiments herein illustrated for purposes of disclosure all within the scope of this invention and within the spirit of the appended claims.

What I claim is:

1. In an automobile passenger cooling system for automobile bodies having a windshield air port, a multiple grill port structure provided with port openings therein and mounted in the automobile dashboard inside and substantially parallel with the said windshield air port, said multiple grill port having one of its port openings adjacent said windshield air port and the other of its port openings farther removed from the automobile windshield than the first port in said grill port, the last said port opening directly connected to a cold air source within the automobile by ducts and the first of said grill ports connected to the interior of the automobile body to draw air therefrom, said ports having independent velocity and directional vane means therein to control and direct the air from the other port behind and within the air from said windshield air port and the cold air behind and within the discharge from both of the other said ports.

2. In an automobile passenger cooling system air circulating and control apparatus applicable to automobile bodies having passenger seats removed from the body shell, an air inlet positioned directly behind the windshield portion of the automobile body to direct upwardly and discharge over said windshield and along the inside of said body shell and adjacent thereto, a pair of air ports having directional and velocity control vanes therein arranged behind the said windshield air inlet port, one port of said pair directed generally upward and discharging a layer of air parallel with but inside the discharge of the first said air inlet port, and the other port of said pair directed behind both of the other said ports and discharging inside their discharges, duct work connecting another of the paired ports directly to a powered air-cooling device and openings connecting the other of said paired ports to a secondary source of pre-cooled air within the automobile body and means connecting the first said air inlet port to the air outside the automobile body, said structure providing means for producing layered air zones within said body and for creating differences of temperature, density and speed in said zones.

3. The method of insulating and air conditioning the interior of an automobile body having a solid heat conducting shell and passenger seats separated from said shell by air spaces, which includes discharging and directing a relatively slow moving layer of air over the inner side of said shell at a temperature only slightly less than the shell temperature to provide an insulating blanket therefor, directing and circulating a secondary layer of air, different in temperature density and speed from the first said blanket air, wholly within said blanket layer to afford a secondary temperature gradient and to provide a core space wherein the passenger seating is arranged, then discharging direct passenger cooling air into the core space and against the passengers therein at a third temperature and density so that said core is doubly insulated and the cooling therein facilitated.

4. A method of insulating and air conditioning the passenger space in an automobile as differentiated from the whole automobile body which includes circulating an insulating blanket layer of slow moving air adjacent the body wall of the automobile on the inner side thereof, moving a secondary layer of air within the first said blanket layer at an increased velocity and decreased temperature and thereby differentiated from the first said layer by both speed and density, then introducing colder and more dense air within the passenger occupancy space and the insulated core formed by the aforesaid layers.

References Cited in the file of this patent

UNITED STATES PATENTS

| | | |
|---|---|---|
| 1,938,559 | Hueber | Dec. 5, 1933 |
| 2,017,579 | Anderson | Oct. 15, 1935 |
| 2,159,495 | Anderson | May 23, 1939 |
| 2,210,458 | Keilholtz | Aug. 6, 1940 |
| 2,247,987 | Carson | July 1, 1941 |
| 2,304,642 | Hans | Dec. 8, 1942 |
| 2,372,377 | Hans | Mar. 27, 1945 |

FOREIGN PATENTS

| | | |
|---|---|---|
| 747,740 | Germany | Jan. 24, 1944 |
| 995,730 | France | Aug. 22, 1951 |